United States Patent Office 2,697,087
Patented Dec. 14, 1954

2,697,087

COMPOUNDING RUBBERLIKE BUTADIENE POLYMERS WITH 1, 5, PENTANEDIOL DIESTERS

Stanford J. Hetzel, Cheltenham, Pa., assignor to Sun Oil Company, Philadelphia, Pa., a corporation of New Jersey No Drawing. Application October 24, 1951,
Serial No. 252,975

11 Claims. (Cl. 260—31.6)

This invention relates to the compounding of rubberlike butadiene polymers and particularly to the incorporation of a plasticizing material in the compounding formula. The invention is particularly advantageous when employed in the compounding of rubber-like copolymers of butadiene and acrylonitrile.

It is well known in the art to polymerize butadiene or derivatives thereof, with or without other materials entering into the polymerization reaction. For example, it is known to polymerize butadiene by itself to obtain a rubber-like polymer. Also it is known to copolymerize butadiene with other materials such as styrene or acrylonitrile, and to polymerize isoprene, methyl isoprene, or chloroprene, by themselves or with other materials, to obtain rubber-like polymers. The latter polymers of butadiene derivatives are considered as rubber-like butadiene polymers within the scope of the present invention.

The polymers which are obtained from butadiene generally require plasticization and vulcanization in order to render them suitable for the various uses to which they are put. In many cases the plasticization of the polymer is a difficult problem. For example, butadiene-acrylonitrile copolymer is extremely difficult to render plastic by milling, and it is generally necessary to add a plasticizing constituent to the compounding formula in order to obtain a suitable degree of plasticity of the polymer.

The requirements which a material must meet in order to be a suitable plasticizer for rubber-like butadiene polymers include relatively low volatility of the plasticizer material and compatibility of the plasticizer in suitable quantities with the butadiene polymer. Also, the nature of the plasticizer has an effect on the ultimate properties of the vulcanized butadiene polymer and a suitable plasticizer must provide good properties such as tensile strength, modulus, elongation, hardness, etc.

According to the present invention rubber-like butadiene polymers are plasticized with a 1,5-pentanediol diester of a monocarboxylic acid, which acid has 5 to 20 carbon atoms. Such diesters are good plasticizers for butadiene polymers since they are relatively non-volatile and therefore provide a particularly stable composition, since they are compatible with butadiene polymers in large enough proportions to provide desirable properties in the plasticized composition, and since the ultimate properties of products obtained by vulcanizing butadiene polymers plasticized with the diesters are particularly good for the uses to which those products are put.

A 1,5-pentanediol is a dihydroxy alkane having a straight chain of 5 carbon atoms with one hydroxyl on each of the terminal carbon atoms. The 1,5-pentanediol can have non-interfering substituents such as alkyl, alkoxy, or halogen substituents, etc., on the non-terminal carbon atoms. The compound 1,5-pentanediol, $C_5H_{12}O_2$, is a particularly suitable compound of the above class.

The monocarboxylic acids which can be used to esterify 1,5-pentanediols to prepare esters for use according to the present invention include aromatic, aliphatic, alicyclic, heterocyclic acids, etc. Examples of aromatic acids which can be employed are benzoic, toluic, xylic, ethyl benzoic, phenyl acetic, phenoxy acetic, phenyl butyric, cuminic, naphthoic acids, etc. Aliphatic acids which can be employed include caproic, caprylic, pelargonic, lauric, myristic, palmitic, stearic, arachidic, teracrylic, hendecenoic, hypogeic, oleic, elaidic acids, etc. Alicyclic acids which can be employed include cyclopentanoic, hexahydrobenzoic, cyclohexylacetic, cycloheptanoic acids, etc. Heterocyclic acids which can be employed include furoic, picolinic acids, etc.

The esters which are used according to the present invention can be prepared in any suitable manner, for example by the methods disclosed for esterification of 1,5-pentanediols with monocarboxylic acids in my copending applications, Serial Nos. 183,628 and 190,639, filed September 7, 1950, and October 17, 1950 respectively in which esterification of 1,5-pentanediols with aliphatic and aromatic acids is disclosed, in my copending application, Serial No. 46,183, filed August 25, 1948, which latter application discloses esterification of 1,5-pentanediol with furoic acid, and in my U. S. Patent 2,500,033, March 7, 1950, in which the esterification of 1,5-pentanediol with cyclohexylacetic acid is disclosed. A generally suitable method involves refluxing together a 1,5-pentanediol and monocarboxylic acid in the presence of a solvent and catalyst, and recovering the ester from the products by vacuum distillation.

It is noted that the acid which is employed to make a diester of a 1,5-pentanediol should not contain more than 20 carbon atoms since diesters prepared from acids which have more than 20 carbon atoms are not sufficiently compatible with butadiene polymers to be suitable for use according to the present invention. Also, the total number of carbon atoms in the diester employed according to the invention should not be more than 45 in order that the ester may be sufficiently compatible with butadiene polymers. It is to be understood that mixed esters can be employed according to the present invention wherein two different acids within the scope of the invention are employed to esterify the two hydroxyl groups of the 1,5-pentanediol.

The diesters employed as plasticizers according to the present invention can be incorporated in the butadiene polymer composition in any suitable manner, for example by milling the ester and the polymer together on heated rolls or by masticating the ester and polymer in an internal mixer such as a Banbury mixer. The relative proportions of ester and polymer can vary. Preferably the amount of ester used per 100 parts by weight of polymer is within the approximate range 5–60 parts by weight. Other compounding ingredients can be admixed with the ester and polymer in any suitable manner, as known in the art.

The following example illustrates the invention:

A butadiene-acrylonitrile copolymer, known commercially by the trade-mark "Hycar OR–15," was compounded according to the following formula:

| | Grams |
|---|---|
| Hycar OR–15 | 100.0 |
| Zinc oxide | 5.0 |
| Stearic acid | 1.0 |
| Sulfur | 1.5 |
| "SRF Black" (a commercial carbon black) | 60.0 |
| Benzothiazyl disulfide | 1.5 |
| Plasticizer | 30.0 |

Five different batches of the compounding formula were made, each with a different plasticizer. The five plasticizers employed were:

1,5-pentanediol dibenzoate
1,5-pentanediol dicaprylate
1,5-pentanediol dioleate
1,5-pentanediol difuroate
1,5-pentanediol bis-cyclohexlacetate Each of the batches was homogenized by milling on the rolls of a 3-inch by 8-inch rubber mill. In each case the length of time required to obtain good homogenization of the composition was measured. These are given subsequently in Comparison Example II. In each case it was possible to obtain a homogenized mixture within a suitable length of time indicating that the 1,5-pentanediol esters are compatible with Hycar OR-15.

The compounded sheets which were obtained from the milling operation were subsequently, in the cases of the compositions containing 1,5-pentanediol dibenzoate and 1,5-pentanediol dicaprylate, molded at 310° F. and 1200 pounds per square inch pressure for 25 minutes. The composition containing 1,5-pentanediol dibenzoate was found to have a tensile strength of 2580 pounds per square inch, a modulus at 300% elongation of 1620 pounds per square inch, an elongation at break of 495%, and a Shore hardness of 53. The molded composition containing 1,5-pentanediol dicaprylate was found to have tensile strength of 1950, modulus of 1550, elongation at break of 375% and Shore hardness of 47.

*Comparison Example I*

The tensile strength of the molded composition containing 1,5-pentanediol dizenzoate was found in a comparative test to be 330 pounds per square inch greater than the tensile strength of a corresponding molded composition prepared in an indentical manner except that, in place of 1,5-pentanediol dibenzoate, di(2-ethyl hexyl)-phthalate was employed as the plasticizer. This shows that 1,5-pentanediol dibenzoate provides higher tensile strength in vulcanized butadiene-acrylonitrile polymers than does a prior art plasticizer for such polymers.

*Comparison Example II*

In order to compare the plasticizers used according to the present invention with another prior art plasticizer a Hycar OR–15 composition was prepared from the compounding formula given above employing ethylene glycol dinaphthenate as plasticizer. The ester was prepared by esterifying ethylene glycol in a conventional manner with naphthenic acids obtained from petroleum. The naphthenic acids had an average molecular weight (calculated) of about 330, indicating that the naphthenic acid contained an average of about 22 carbon atoms per molecule. The esterification was conducted with an excess of naphthenic acid in order to insure esterification of both hydroxyl groups of the ethylene glycol. It was found that 45 minutes milling time was required to homogenize the composition containing ethylene glycol dinaphthenate as compared with 21 minutes in the case of 1,5-pentanediol dibenzoate, 10 minutes in the case of 1,5-pentanediol dicaprylate, 11 minutes in the case of 1,5-pentanediol dioleate, 13 minutes in the case of 1,5-pentanediol difuroate, and 8 minutes in the case of 1,5-pentanediol bis-cyclohexylacetate. The sheeted product obtained from the milling operation containing ethylene glycol dinaphthenate was found, after 24 hours had elapsed since the milling operation, to have an oily film thereon indicating that the plasticizer had exuded from the sheet. In the case of the 1,5-pentanediol esters, on the other hand, no exuding of plasticizer after 24 hours was observed.

This example shows the superiority of esters according to the invention to the prior art plasticizer, ethylene glycol dinaphthenate.

In applicant's copending application Serial No. 183,628 filed September 7, 1950, vinyl polymers plasticized with diesters of 1,5-pentanediol and aromatic monocarboxylic acids having the carboxyl group joined directly to the aromatic ring are disclosed and claimed. In copending application Serial No. 280,183 filed April 2, 1952 by the instant inventor, esters of 1,5-pentanediol and certain aliphatic and aromatic monocarboxylic acids are disclosed and claimed. In copending application Serial No. 321,511 filed November 19, 1952 by the instant inventor, vinyl polymers plasticized with 1,5-pentanediol diesters of aryl-substituted aliphatic monocarboxylic acids having 2 to 5 carbon atoms in the aliphatic portion of the molecule are disclosed and claimed. In copending application Serial No. 198,737 filed December 1, 1950 by the instant inventor, certain cellulose derivatives plasticized with 1,5-pentanediol diesters of monocarboxylic acid aromatic acids are disclosed and claimed.

The invention claimed is:

1. A rubber-like butadiene-acrylonitrile coplymer plasticized with a diester of 1,5-pentanediol and a monocarboxylic acid, which acid has 5 to 20 carbon atoms inclusive.

2. A rubber-like butadiene-acrylonitrile copolymer plasticized with a diester of 1,5-pentanediol and an aromatic monocarboxylic acid, which acid has not more than 20 carbon atoms.

3. A rubber-like butadiene-acrylonitrile copolymer plasticized with 1,5-pentanediol dibenzoate.

4. A rubber-like butadiene-acrylonitrile copolymer plasticized with a diester of 1,5-pentanediol and an alpihatic monocarboxylic acid, which acid has 5 to 20 carbon atoms inclusive.

5. A rubber-like butadiene-acrylonitrile copolymer plasticized with 1,5-pentanediol dicaprylate.

6. A rubber-like butadiene-acrylonitrile copolymer plasticized with 1,5-pentanediol dioleate.

7. A rubber-like butadiene-acrylonitrile copolymer plasticized with a diester of 1,5-pentanediol and an alicyclic monocarboxylic acid, which acid has 5 to 20 carbon atoms inclusive.

8. A rubber-like butadiene-acrylonitrile copolymer plasticized with 1,5-pentanediol bis-cyclohexylacetate.

9. A rubber-like butadiene-acrylonitrile copolymer plasticized with a diester of 1,5-pentanediol and a heterocyclic monocarboxylic acid, which acid has 5 to 20 carbon atoms inclusive.

10. A rubber-like butadiene-acrylonitrile copolymer plasticized with 1,5-pentanediol difuroate.

11. A rubber-like butadiene-arcylonitrile copolymer plasticized with a diester of a glycol selected from the group consisting of 1,5-pentanediol and derivatives thereof having on non-terminal carbon atoms at least one substituent selected from the group consisting of alkyl, alkoxy, and halogen substituents, and a monocarboxylic acid having 5 to 20 carbon atoms inclusive.

References Cited in the file of this patent

FOREIGN PATENTS

| Number | Country | Date |
|--------|---------|------|
| 404,554 | Italy | June 18, 1943 |